US005666187A

United States Patent [19]

Kim

[11] Patent Number: 5,666,187

[45] Date of Patent: Sep. 9, 1997

[54] METHOD AND APPARATUS FOR CONTROLLING THE DRIVING OF AN OZONE EMISSION FAN IN AN IMAGE FORMING APPARATUS

[75] Inventor: Young-Ju Kim, Suwon, Rep. of Korea

[73] Assignee: SamSung Electronics Co., Ltd., Suwon, Rep. of Korea

[21] Appl. No.: 696,134

[22] Filed: Aug. 13, 1996

[30] Foreign Application Priority Data

Aug. 18, 1995 [KR] Rep. of Korea .................. 25481/1995

[51] Int. Cl.$^6$ .................................................... G03B 27/52

[52] U.S. Cl. ................................ 355/30; 355/77; 399/92; 399/93

[58] Field of Search ................................ 355/18, 30, 77; 315/307; 399/75, 76, 91, 92, 93

[56] References Cited

U.S. PATENT DOCUMENTS

| | | | |
|---|---|---|---|
| 4,903,072 | 2/1990 | Iwata | 355/30 |
| 5,127,159 | 7/1992 | Nakagama et al. | 355/30 |
| 5,155,531 | 10/1992 | Kurotori et al. . | |
| 5,164,778 | 11/1992 | Tanabe et al. . | |
| 5,307,132 | 4/1994 | Tsuchiya . | |
| 5,371,577 | 12/1994 | Fujimura et al. . | |
| 5,508,782 | 4/1996 | Koh et al. . | |

*Primary Examiner*—Arthur T. Grimley
*Assistant Examiner*—Herbert V. Kerner
*Attorney, Agent, or Firm*—Robert E. Bushnell, Esq.

[57] ABSTRACT

A method and apparatus for controlling driving of an ozone emission fan includes the steps of: when an external printing command is provided, outputting a control signal for driving the ozone emission fan; printing image data externally inputted after outputting the control signal for driving the ozone emission fan; and after the printing operation, outputting another control signal for stopping the ozone emission fan.

6 Claims, 2 Drawing Sheets

METHOD AND APPARATUS FOR CONTROLLING THE DRIVING OF AN OZONE EMISSION FAN IN AN IMAGE FORMING APPARATUS

CROSS REFERENCE TO RELATED APPLICATION

This application makes reference to, incorporates the same herein, and claims all benefits accruing under 35 U.S.C. §119 from an application for Method For Controlling Driving Of Ozone Emission Fan In Image Forming Apparatus earlier filed in the Korean Industrial Property Office on 18 Aug. 1995 and there duly assigned Serial No. 25481/1995.

BACKGROUND OF THE INVENTION

1. Field of the Invention

The present invention relates to an image forming apparatus, and more particularly, to a method and apparatus for controlling the driving of an ozone emission fan, which is capable of preventing noise generated by the ozone emission fan when the image forming apparatus is in a standby state.

2. Description of the Related Art

In general, as an image forming apparatus, a printer has an ozone emission fan for emitting ozone generated due to a corona discharge. The ozone generated owing to the corona discharge is composed of an oxide compound which affects the printer and the human body. Accordingly, the ozone is emitted to the atmosphere by being changed into harmless oxygen using an ozone filter. A main function of the ozone emission fan is to circulate the ozone so that the ozone can pass through the ozone filter. According to contemporary practice in the art however, if power is provided to the printer, the ozone emission fan is continuously driven. A problem may arise in that noise is continuously generated.

Tanabe et al., U.S. Pat. No. 5,164,778 entitled Image Forming Apparatus With Ozone Detection And Deodorizer turns an ozone emission fan on and off in response to the detection of the ozone concentration going above and below predetermined limits rather than merely turning the fan on and off dependent upon whether the printer is printing as in the present invention. Accordingly, the control of the emission fan in Tanabe et al. is far more complicated than necessary, and thus presents too many sources of failure.

Kurotori et al., U.S. Pat. No. 5,155,531 entitled Apparatus For Decomposing Ozone By Using A Solvent Mist, discloses an apparatus in which a fan is turned on only after a fan start key has been depressed or a copy start key has been depressed and a predetermined number of copies are to be made and turns the fan off after the copying operation has been completed. As with Tanabe et al., the control arrangement of Kurotori et al. is more complicated necessary.

Also, Tsuchiya, U.S. Pat. No. 5,307,132 entitled Image Forming Apparatus Having A Controller For Discharging Air In Response To A Heating Condition Of An Image Fixing Device, as with Tanabe et al. and Kurotori et at., discloses a control system for controlling a fan which is far more complicated than necessary. Moreover, I have found that contemporary practice in the art fails to recognize a need to conserve electrical power consumed by operation of the ozone fan.

SUMMARY OF THE INVENTION

It is therefore, an object of the invention to provide a method and apparatus conserving power consumed by an ozone emission fan.

It is another object to provide a method and apparatus driving an ozone fan only during a printing operation.

It is yet another object to provide a method and apparatus that turns on an ozone emission fan only during the operation of an image forming apparatus and turns the fan off during the stand-by state of the apparatus as in the present invention.

The above-noted objects maybe effected by providing a method of controlling the driving of an ozone emission fan of an image forming apparatus, when an external printing command is provided, by outputting a control signal for driving the ozone emission fan; printing externally inputted image data after outputting the control signal for driving the ozone emission fan; and after completion of the printing operation, outputting another control signal for stopping the ozone emission fan.

The above-noted objects may also be effected by providing an apparatus for controlling the driving of an ozone emission fan of an image forming apparatus. The controlling apparatus may be constructed with a receiver for receiving an external printing command and a controller, connected to the receiver, for driving the ozone emission fan. After the image forming apparatus has printed externally inputted image data, the controller generates a control signal for stopping the ozone emission fan.

Furthermore, the above-noted objects may be effected by providing controller for controlling the driving of an ozone emission fan of an image forming apparatus. The controller has a video controller and a print engine and an operating panel. The video controller has a computer interface for interfacing with an external computer for interfacing input and output signals transmitted therebetween. The operating panel has a plurality of keys for inputting commands and a display for displaying information. The video controller is operatively connected to the computer interface and the operating panel for receiving, storing and converting data received from the computer interface into image data to be processed by the printing engine according to a predetermined program and for transmitting the converted data to an output. An engine interface is operatively connected to the video controller, for receiving converted data from said video controller and for outputting data to the print engine. The print engine has a video interface operatively connected to the engine interface for interfacing transmission and reception of signals between the video controller and the print engine. An engine controller is operatively connected to the video interface for receiving signals from the video interface. An input/output interface is operatively connected to the engine controller for receiving signals output from the engine controller and a sensor is operatively connected to the input/output interface, for sensing various states of the image forming apparatus and for providing output signals corresponding thereto. An implement driver is operatively connected to the input/output interface, for receiving signals from the input/output interface and for driving the ozone emission fan. An electrophotographic developer is operatively connected to the input/output interface, for printing the image according to image data from the input/output interface. When an external print command is provided to the computer interface, the implement driving means outputs a control signal for driving the ozone emission fan and after the electrophotographic developer has printed externally inputted image data, the implement driver outputs another control signal for stopping the ozone emission fan.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following description, the specific details have been set forth to provide a more thorough understanding of the present invention. It will be apparent, however, to one skilled in the art, that the present invention may be practiced without these specific details. In other instances, well known features have not been described in detail so as not to obscure the present invention.

Figure 1:
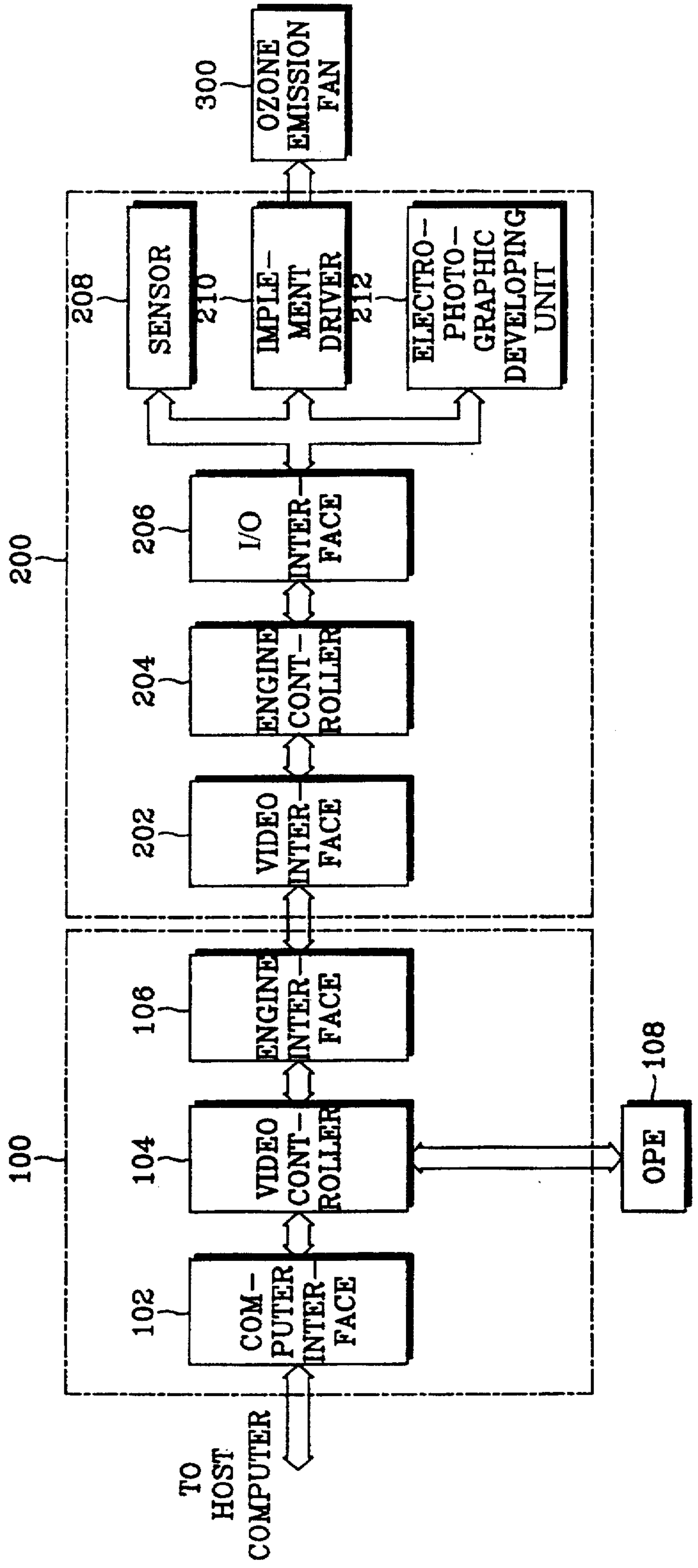
FIG. 1 is a block diagram of a printer in which an ozone emission fan is operated according to the present invention.

FIG. 1 is a block diagram of a printer in which an ozone emission fan is operated according to the present invention. In FIG. 1, the printer has a video control unit 100, a print engine unit 200, and an operating panel OPE 108. In more detail, the video control unit 100 is comprised of a computer interface 102, a video controller 104, and an engine interface 106. The computer interface 102 is connected between a host computer and the video controller 104 to interface the input/output signals transmitted therebetween. The video controller 104 has a ROM, the OPE 108, and a RAM for temporarily storing various kinds of data inputted from the host computer. And, the video controller 104 converts code data received from the computer interface 102 into image data to be processed by the print engine unit 200 according to a predetermined program, and then transmits the converted data to the print engine unit 200. The engine interface 106 interfaces the print engine unit 200 with video controller 104. The OPE 108 is controlled by the video controller 104, and has a plurality of keys for inputting various commands and a display for displaying information according to the operation of the printer. The print engine unit 200 is comprised of a video interface 202, an engine controller 204, an I/O interface 206, a sensor 208, an implement driver 210, and an electrophotographic developing unit 212. In addition, the print engine unit 200 is connected to the video control unit 100. The video interface 202 interfaces transmission and reception of signals between the video control unit 100 and the engine controller 204. The engine controller 204 controls the implement driver 210 and the electrophotographic developing part 212 under control of the video controller 104, and prints an image according to the image data received the video control unit 100 onto recording paper. Also, the engine controller 204 watches for operating states of each element of the print engine unit 200, feed and conveyance states of the recording paper, and the amount of developing material. The engine controller 204 has a nonvolatile semiconductor memory having a program for driving and stopping the ozone emission fan in accordance with the present invention, when a printing command is provided from the video control unit 100. The I/O interface 206 is connected between the engine controller 204, the sensor 208, the implement driver 210, and the electrophotographic developing unit 212 to interface the input/output signals of the engine controller 204. The sensor 208 drives various sensors for watching for the operating states of each element of the print engine unit 200, the feed and conveyance states of the recording paper, and the amount of developing material, and also provides sensing signals of the sensors to the engine controller 204. The implement driver 210 drives various implements used for feeding and conveying the recording paper and printing under control of the engine controller 204. The ozone emission fan part 300 is driven and stopped in response to a control signal from the engine controller 204 through the implement driver 210. The electrophotographic developing unit 212 is controlled by the engine controller 204 and prints the image according to the image data depending upon the electrophotographic developing method.

Figure 2:
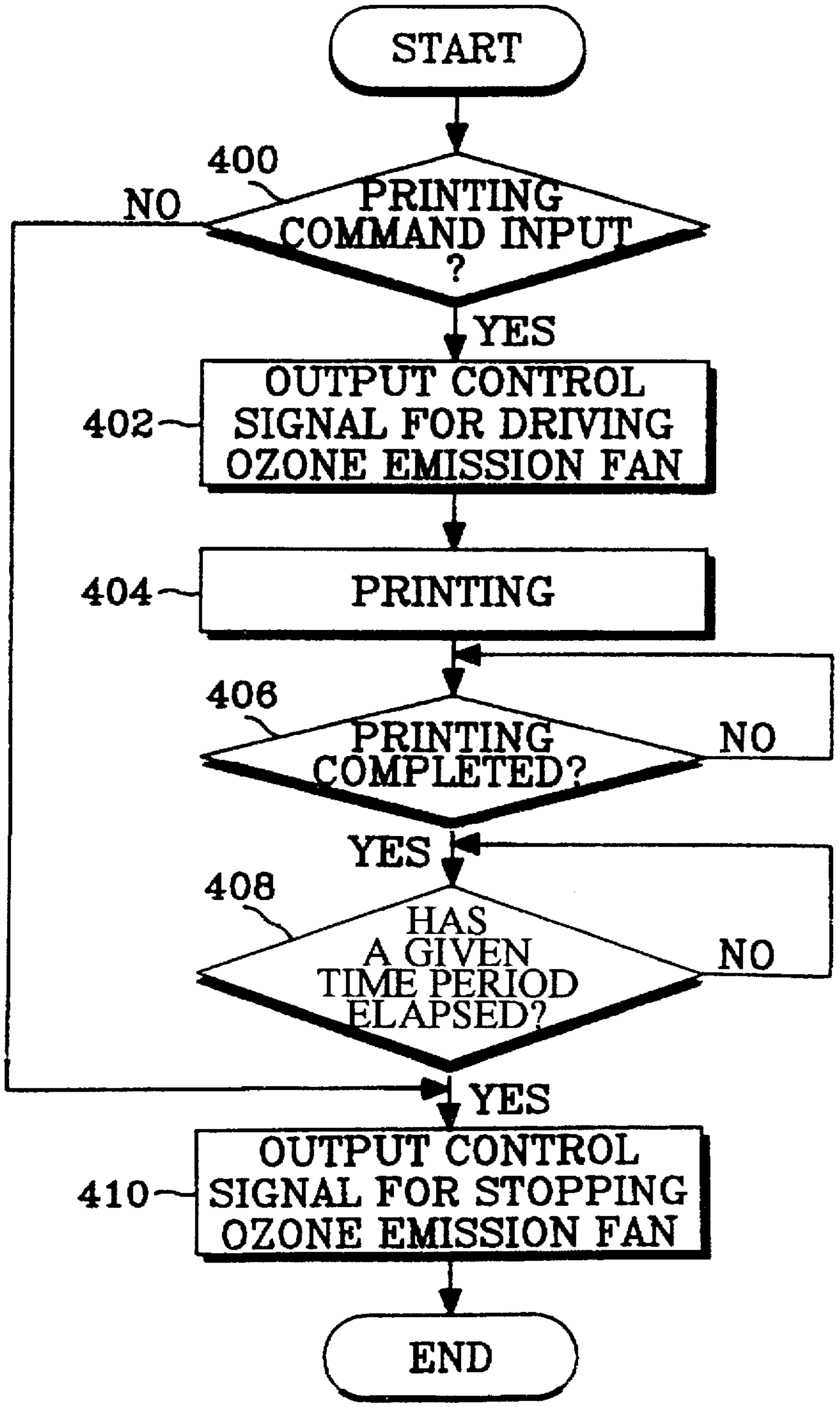
FIG. 2 is a flowchart illustrating the control of an ozone emission fan according to a preferred embodiment of the present invention.

FIG. 2 is a flowchart illustrating the control of the ozone emission fan according to the present invention. The embodiment of the present invention is explained in detail with reference to FIG. 1. First of all, if power is provided to the printer, the printer is placed in a printing standby state after initialization. If there is an external printing command (from the host computer) when the printer is in the printing standby state, the video controller 104 converts the code data transmitted from the host computer into image data capable of being processed in the print engine unit 200. At this point, the video controller 104 outputs a printing command signal to the print engine unit 200 according to a predetermined program stored in the ROM. The engine controller 204 checks, at step 400, whether there is the input printing command signal from the video controller 104. At step 400, if a printing command signal has been inputted, the engine controller 204 outputs, at step 402, a control signal for driving the ozone emission fan to the ozone emission fan 300 through the implement driver 210. Thereafter, at step 404, the engine controller 204 controls each element of the print engine unit 200 and prints the image according to the received image data onto the recording paper. Then, the operation proceeds to step 406. At step 406, the engine controller 204 checks whether or not the printing operation has been completed. If the printing operation has been completed, the engine controller 204 measures the passage of a given period of time depending upon the predetermined program. The reason for the engine controller 204 to measure the given period of time is that the remaining ozone in the interior of the printer must be eliminated after the printing operation. Then, at step 408, the engine controller 204 checks whether or not a the given period of time has elapsed in accordance with the predetermined program. If the given period of time has elapsed, the operation proceeds to step 410. At step 410, the engine controller 204 outputs the control signal to the ozone emission fan 300 through the implement driver 210, the control signal being used for stopping the ozone emission fan.

As mentioned above, according to the present invention, the ozone emission fan is driven during only the printing operation, and it is stopped during the standby state. Accordingly, in the present invention, there is provided an efficiency in that the noise generated during the driving of the ozone emission fan can be prevented.

Although only the preferred embodiment of the present invention is described herein, various modifications can be implemented within the spirit and the scope of the present invention. For example, the engine controller of the image forming apparatus can output the control signal so as to stop the ozone emission fan under driving after the printing operation. Furthermore, an embodiment of the present invention can be applied to appliances utilizing a cooling fan to perform an ozone emission function, if necessary.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of controlling the driving of an ozone emission fan of an image forming apparatus, comprising the steps of:

when an external printing command is provided, outputting a control signal for driving the ozone emission fan;

outputting the control signal for driving the ozone emission fan, in correspondence with externally inputted image date; and after an output of the externally inputted image data is completed, outputting another control signal for stopping the ozone emission fan.

2. The method as claimed in claim 1, wherein the another control signal for stopping the ozone emission fan is outputted a given period of time after the printing operation has been completed.

3. An apparatus for controlling the driving of an ozone emission fan of an image forming apparatus, said controlling apparatus comprising:

a means for receiving an external printing command;

a control means, connected to said means for receiving an external printing command, for driving the ozone emission fan;

wherein, after the image forming apparatus has printed externally inputted image data, said control means outputs a control signal for stopping the ozone emission fan.

4. The apparatus as claimed in claim 3, wherein said control means includes a means for measuring the passages of time such that said control signal for stopping the ozone emission fan is outputted a given period of time after said image forming apparatus has completed printing externally inputted image data.

5. An apparatus for controlling the driving of an ozone emission fan of an image forming apparatus, said controlling apparatus comprising:

a video control means and a print engine means and an operating panel;

said video control means comprising:

a computer interface means for interfacing with an external computer for interfacing input and output signals transmitted therebetween;

a video controller means, operatively connected to said computer interface means and said operating panel for receiving, storing and converting data received from said computer interface means into image data to be processed by said printing engine means according to a predetermined program and for transmitting the converted data to an output thereof; and an engine interface means, operatively connected said video controller means, for receiving said converted data output from said video controller and for outputting data to said print engine means;

said operating panel comprising a plurality of keys for inputting commands and a display for displaying information;

said print engine means comprising:

a video interface means, operatively connected to said engine interface means, for interfacing transmission and reception of signals between said video controller means and said print engine means;

an engine controller means, operatively connected to said video interface means for receiving signals from said video interface means;

an input/output interface means, operatively connected to said engine controller means for receiving signals output from said engine controller means;

a sensor means operatively connected to said input/output interface, for sensing various states of the image forming apparatus and for providing output signals corresponding thereto;

an implement driver means, operatively connected to said input/output interface, for receiving signals from said input/output interface and for driving the ozone emission fan; and an electrophotographic developing means, operatively connected said input/output interface, for printing the image according to image data output from said input/output interface;

wherein, when an external print command is provided to said computer interface, said implement driving means outputs a control signal for driving the ozone emission fan and after said electrophotographic developing means has printed externally inputted image data, said implement driving means outputs another control signal for stopping the ozone emission fan.

6. The apparatus as claimed in claim 5, wherein said engine controller means further comprises a means for measuring the passages of time, wherein said controller signal for stopping the ozone emission fan is outputted a given period of time after the printing operation has been completed.

* * * * *